(12) United States Patent
Ziegenhagen et al.

(10) Patent No.: US 12,607,603 B2
(45) Date of Patent: Apr. 21, 2026

(54) ADJUSTABLE CENTERING FEET ASSEMBLY FOR EDDY CURRENT PROBE

(71) Applicant: Zetec, Inc., Snoqualmie, WA (US)

(72) Inventors: William Frederick Ziegenhagen, Black Diamond, WA (US); Paublas M. Tarango, Renton, WA (US); Evan Lloyd, Fall City, WA (US); Wayne Rector, Bellevue, WA (US); Adis Ozegovic, Issaquah, WA (US); Stephen Timm, Bellevue, WA (US); Maria Almanza, Bellevue, WA (US)

(73) Assignee: Zetec, Inc., Snoqualmie, WA (US)

( * ) Notice: Subject to any disclaimer, the term of this patent is extended or adjusted under 35 U.S.C. 154(b) by 273 days.

(21) Appl. No.: 18/448,604

(22) Filed: Aug. 11, 2023

(65) Prior Publication Data

US 2024/0053298 A1 Feb. 15, 2024

Related U.S. Application Data

(60) Provisional application No. 63/371,253, filed on Aug. 12, 2022.

(51) Int. Cl.
 G01N 27/9093 (2021.01)
(52) U.S. Cl.
 CPC ................................ G01N 27/9093 (2013.01)

(58) Field of Classification Search
 CPC ..... F16L 2101/30; F16L 55/28; G01M 15/02; G01N 27/9093; G01N 27/9006; G01N 27/902; G01N 27/9013; G01N 29/225; G01N 29/223
 See application file for complete search history.

(56) References Cited

U.S. PATENT DOCUMENTS

| | | | | |
|---|---|---|---|---|
| 5,969,275 A | * | 10/1999 | Moe | G01B 5/0002 73/866.5 |
| 7,134,442 B2 | * | 11/2006 | Ma | A45B 25/14 135/20.1 |
| 2008/0289421 A1 | * | 11/2008 | Brignac | F16L 55/28 73/866.5 |

* cited by examiner

*Primary Examiner* — Tarun Sinha
(74) *Attorney, Agent, or Firm* — Snyder, Clark, Lesch & Chung, LLP

(57) ABSTRACT

A centering assembly for an eddy current probe includes a foot element having a plurality of resilient cantilevered legs projecting radially about a central aperture and an adjustment element moveable relative to the foot element for exerting a radial force on the plurality of resilient cantilevered legs. Movement of the adjustment element allows an outside diameter of the plurality of resilient cantilevered legs to be maintained consistent as the plurality of resilient cantilevered legs are worn down during use.

19 Claims, 4 Drawing Sheets

ADJUSTABLE CENTERING FEET ASSEMBLY FOR EDDY CURRENT PROBE

CROSS-REFERENCE TO RELATED APPLICATION

The present application is a non-provisional of and claims priority to U.S. Provisional Patent Application No. 63/371, 253, filed on Aug. 12, 2022, the entirety of which is hereby incorporated by reference herein.

BACKGROUND

Steam generation for driving turbines has been an aspect of electrical power generation, for many decades. Routine monitoring of the condition of high-pressure steam tubes in steam generators is critical. Steam tube inspection is generally conducted with cylindrically shaped eddy current probes that are inserted into steam tube arrays and travel through the arrays/tubes attached to cabling while monitoring equipment records the eddy current response as the probe travels through the tubes.

Eddy current probes operate by coils alternating an electromagnet field onto a conduit as it travels within the conduit and receiving electromagnetic returns from the conduit. The electromagnetic field produces eddy currents in the tubes, which can be measured either by a change in impedance of the excitation coil or by separate coils, hall-effect sensors or magneto-resistive sensors. In interacting with the conduit structure, the field is able to locate defects by recognizing anomalies, such as disbonds, bubbles, cracks, corrosion, delaminations, thickness variation, and the like.

Common problems affecting the ability to detect tube wear and flaws with eddy current probes include wobble of the probe while travelling through the tube and maintaining the probe evenly centered within the tube so that it is not too close to any one section of the tube wall.

Typical eddy current probes for non-destructive testing of heat exchanger tubing and the like are composed of a probe head supporting a plurality of sensing coils, a flexible plastic conduit with wiring and a connector providing a removable connection to testing equipment. Probe heads often incorporate features to center the coil assembly in the center of the tube under inspection. This centering reduces "lift-off" in which the probe moves away from the tube wall and such centering is important for maintaining good signal quality.

This centering function has been done in the prior art by machined plastic, metallic, or ceramic parts that incorporate a plurality of flexible fingers extending from the probe that apply an equal circumferential force to the inner wall of the tubing under inspection. Such machined parts, typically called feet, have some significant limitations. Because these parts bear against the tube wall, they are subject to wear as the sensor is moved in and out of hundreds of tubes which may involve thousands of feet of sliding friction wear. These effects can drive the sensor out of its centered position causing lift-off errors. Additionally, if the wear on the feet is even but substantial, the feet may no longer press against the tube wall and the sensor may become loose within the tube, which causes erratic movement and creates data quality issues.

Because of probe wear and degradation of signal quality from the probe, it may take many probes to complete a single heat exchanger inspection. Because these inspections occur in radioactive environments, the probes become irradiated and poorly performing probes ultimately become expensive nuclear waste due to failures of these feet.

DESCRIPTION OF THE PREFERRED EMBODIMENTS OF THE INVENTION

The following detailed description refers to the accompanying drawings. The same reference numbers in different drawings may identify the same or similar elements. Also, the following detailed description does not limit the invention.

Implementations described herein relate to non-destructive testing devices that include one or more testing coils for introducing an electromagnetic field into a tubular conduit under test. The non-destructive testing devices include a probe body coupled to a shaft via one or more centering assemblies (also referred to as centering feet). The centering assemblies include one or more resilient portions configured to be radially biased away from the shaft. The resilient portions are configured to engage the internal surface of the conduit under test to keep the probe body centered within the conduit as the probe body travels within the conduit.

Consistent with implementations described herein, the one or more centering assemblies may include a radial adjustment mechanism for allowing manual manually adjustment of the radial displacement of the resilient portions. In this manner, as resilient portions become worn during use, the radial adjustment mechanism may be operated to change the radial displacement of the resilient portions to reduce or eliminate any loosening of the resilient members caused by the wear.

Figures 1A, 1B:
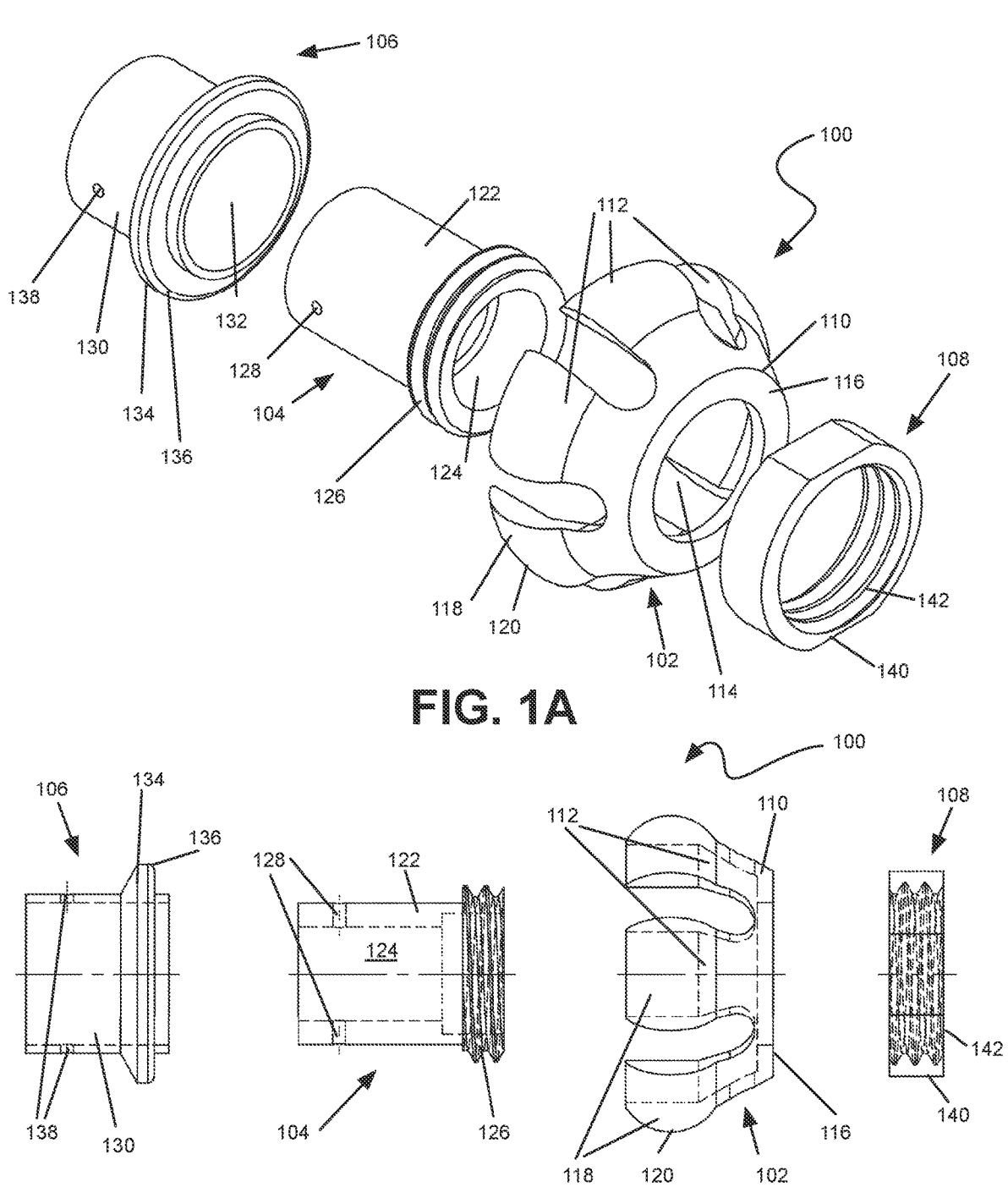
FIG. 1A is an exploded perspective view of a centering assembly consistent with a first embodiment described herein.
FIG. 1B is an exploded side plan view of the centering assembly of FIG. 1A.
Figure 1C:
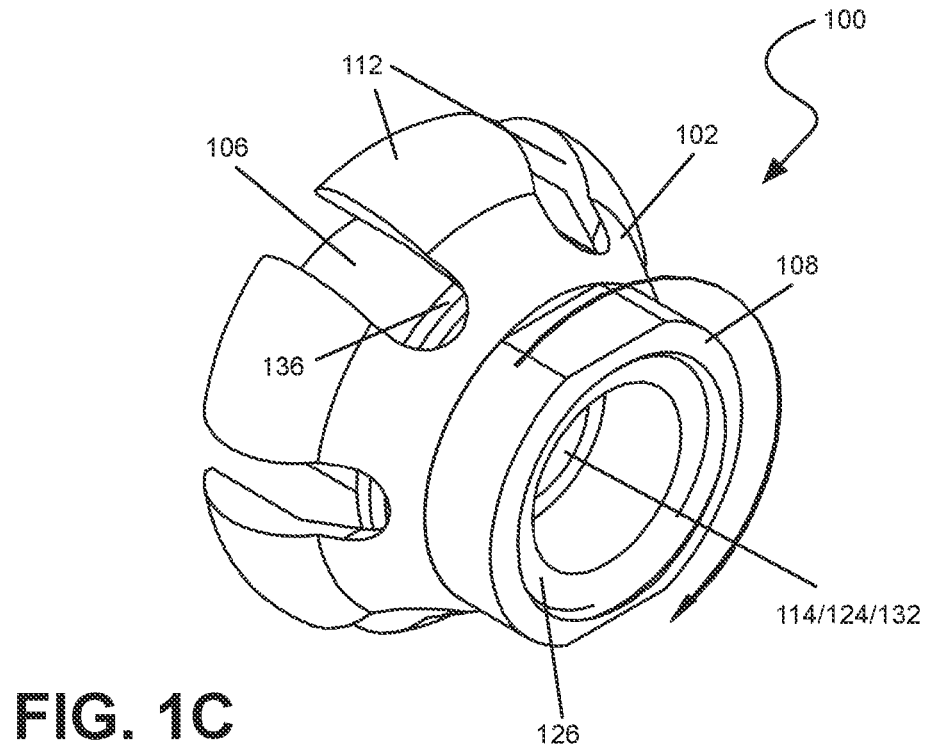
FIG. 1C is a perspective view of the centering assembly of FIG. 1A in an assembled configuration.
Figure 1D:
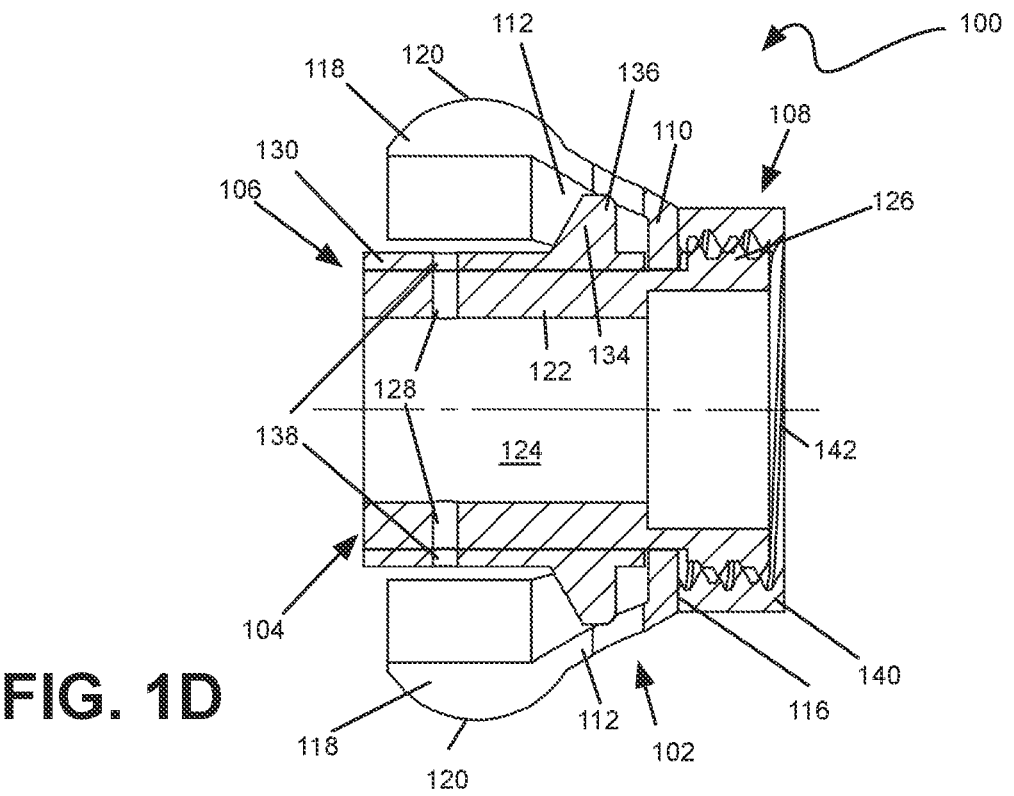
FIG. 1D is a cross-sectional view of the centering assembly of FIG. 1A in the assembled configuration.

FIG. 1A is an exploded perspective view of a centering assembly consistent with a first embodiment described herein. FIG. 1B is an exploded side plan view of the centering assembly of FIG. 1A. FIG. 1C is a perspective view of the centering assembly of FIG. 1A in an assembled configuration. FIG. 1D is a cross-sectional view of the centering assembly of FIG. 1A in the assembled configuration.

Referring to FIGS. 1A-1D, a centering assembly 100 for an eddy current probe incudes a resilient foot element 102, an expander shaft 104, a foot expander 106, and an adjustment nut 108. Resilient foot element 102 generally includes a tubular or frustoconical base 110 from which a plurality of resilient cantilevered legs 112 project radially and distally outwardly therefrom. As shown in FIG. 1A, base 110 includes a central aperture 114 extending therethrough and a planar forward end surface 116. Central aperture 114 is sized to accommodate expander shaft 104, as described below.

As shown in FIGS. 1A and 1B, each cantilevered leg 112 includes a centering foot 118 at its distal end that includes a curvilinear outer surface 120, at least a portion of which is configured to extend beyond a body of an eddy current probe to which centering assembly 100 is attached (not shown). Centering feet 118 on respective legs 112 extend outwardly, such that the circumferentially spaced centering feet 118, and not the eddy current probe body, slidably engage a conduit or tube in which the probe travels. The resilient nature of cantilevered legs 112 allows each leg to flex as necessary to maintain the probe centered within the conduit when the legs 112 engage the conduit inner surface. In one implementation, resilient foot element 102 includes seven cantilevered legs 112, although any suitable number of legs 112 may be used.

As shown in FIGS. 1A and 1B, expander shaft 104 includes a generally tubular body 122 having a central aperture 124 extending therethrough. Central aperture 124 may be sized to receive a portion of a shaft on which an eddy current probe is mounted (not shown). As shown in FIG. 1C, an outside diameter of tubular body 122 is sized for receipt within central aperture 114 of base 110 of resilient foot element 102. A forward end of tubular body 122 includes a threaded portion 126 configured to extend beyond forward end planar forward end surface 116 of resilient foot element 102 to engage adjustment nut 108, as described below. As shown in FIGS. 1A-1D, a portion of tubular body 122 may include one or more transverse through holes 128 to facilitate assembly of centering assembly 100 and coupling of centering assembly to the eddy current probe.

As shown in FIGS. 1A and 1B, foot expander 106 includes a generally tubular body 130 having a central aperture 132 extending therethrough. Central aperture 132 may be sized to receive a portion of body 122 of expander shaft 104. As shown in FIG. 1C, an outside diameter of tubular body 122 is sized for receipt between cantilevered legs 112 of resilient foot element 102.

Consistent with one implementation described herein, foot expander 106 includes a foot expanding flange portion 134 that projects radially outwardly from a forward portion of foot expander body 130. As shown in FIG. 1B, foot expanding flange portion 134 may include a generally planar leading edge 136 configured to engage portions of cantilevered legs 112, as described more fully below. A shown, similar to expander shaft 104, a portion of tubular body 130 may include one or more transverse through holes 138 configured to align with through holes 128 to facilitate coupling of foot expander 106 to expander shaft 104.

Adjustment nut 108 includes an outer engagement surface 140 and an internal threaded surface 142 configured to engage threaded portion 126 of expander shaft 104. In some implementations, outer engagement surface 140 may include a surface configuration for assisting in the turning of adjustment nut 108, such as planar tool engagement portions, a friction surface (e.g., knurling), etc. Rearward surface of adjustment nut 108 is configured to engage planar forward end surface 116 of resilient foot element 102.

As shown in FIG. 1D, when assembled, foot expander 106 is coupled to expander shaft 104 via through holes 138/128 and threaded portion 126 of expander shaft 104 is extended through central aperture 114 in resilient foot element 102. Internal threads 142 in adjustment nut 108 are threaded onto threaded portion 126, and adjustment nut 108 is turned such that leading edge 136 of foot expanding flange portion 134 engages the inner surface of cantilevered legs 112.

Periodically, as curvilinear surfaces 120 of centering feet 118 become worn from use, the outside diameter of resilient foot element 102 may be reduced, which may result in centering feet 118 no longer engaging an inside diameter of a conduit under test. Consistent with implementations described herein, to remediate this condition, adjustment nut 108 may be turned, which causes expander shaft 104 to advance further relative to resilient foot element 102. This advancement causes foot expanding flange portion 134 to deflect cantilevered legs 112 outwardly relative to expander shaft 104, thus restoring the outside diameter of resilient foot element 102 to its initial state. This process may be repeated a number of times, until the geometry of the resilient foot element 102 and foot expander 106 inhibit further advancement.

Figure 2A:
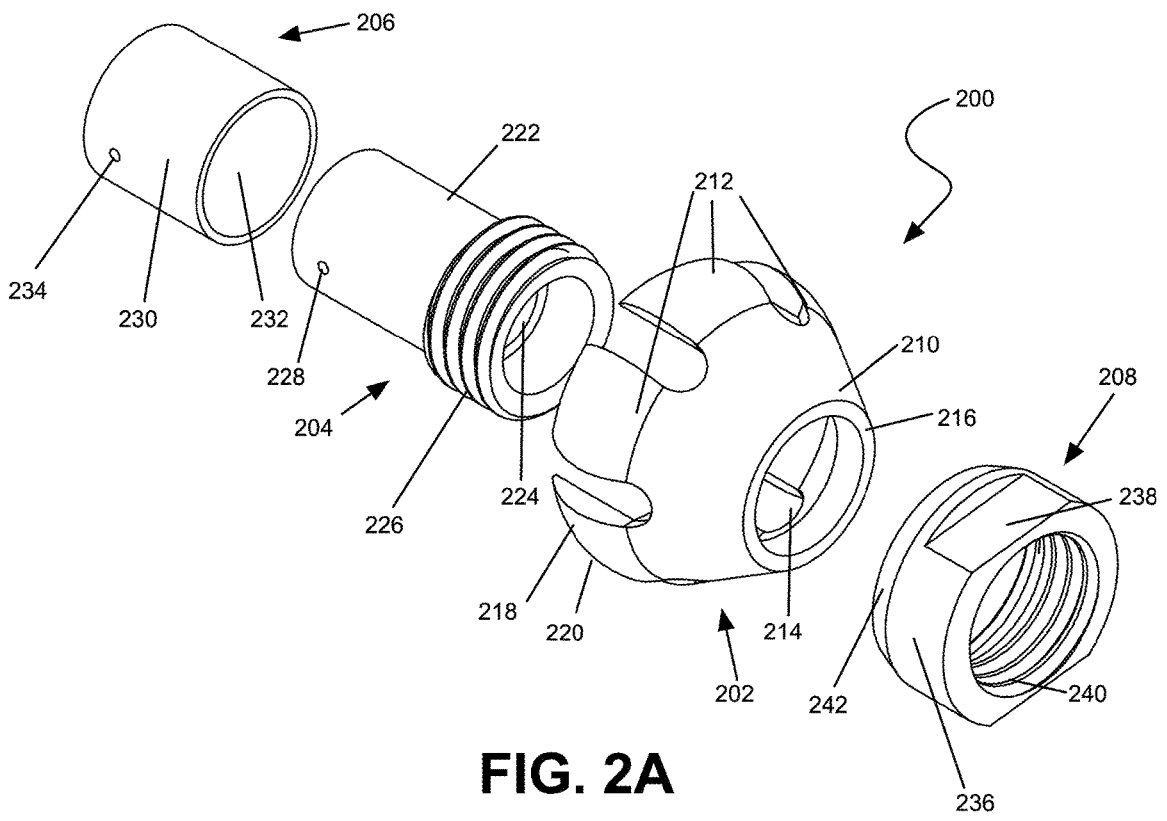
FIG. 2A is an exploded perspective view of a centering assembly consistent with another embodiment described herein.
Figure 2B:
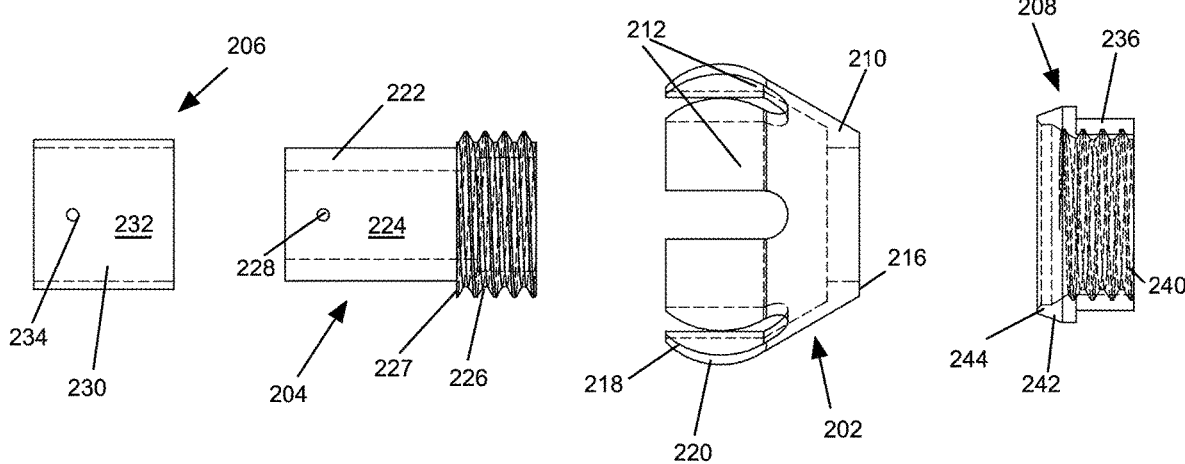
FIG. 2B is an exploded side plan view of the centering assembly of FIG. 2A.
Figure 2C:
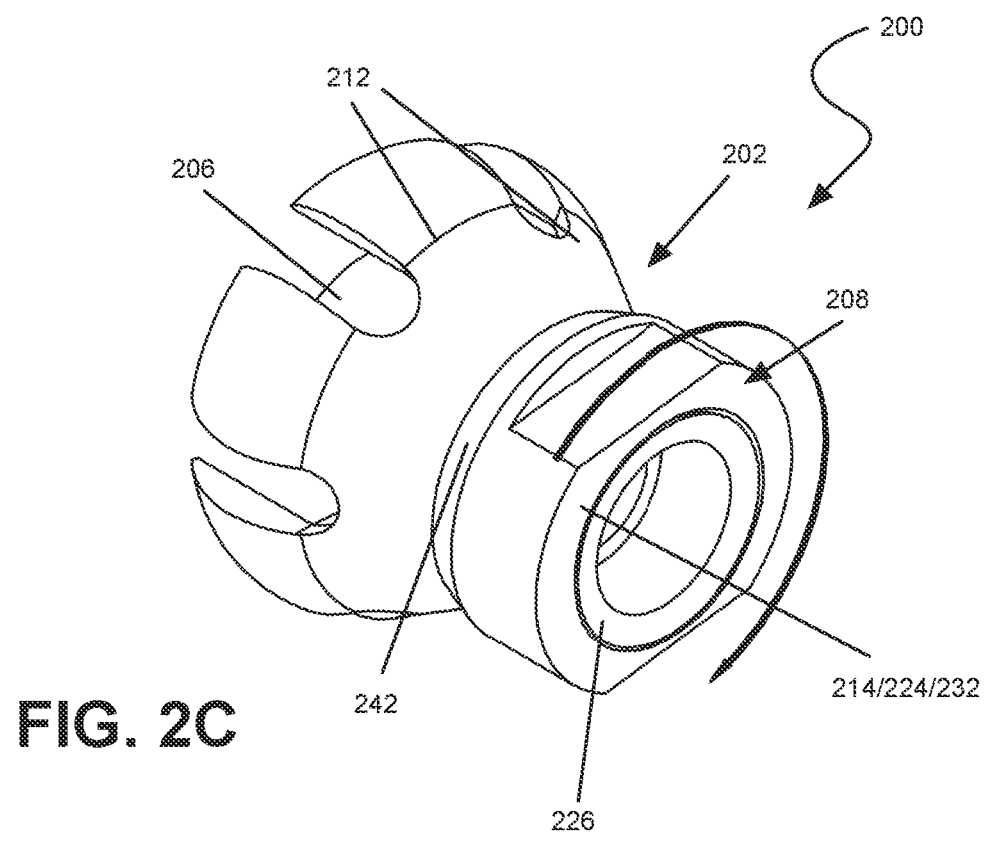
FIG. 2C is a perspective view of the centering assembly of FIG. 2A in an assembled configuration.
Figure 2D:
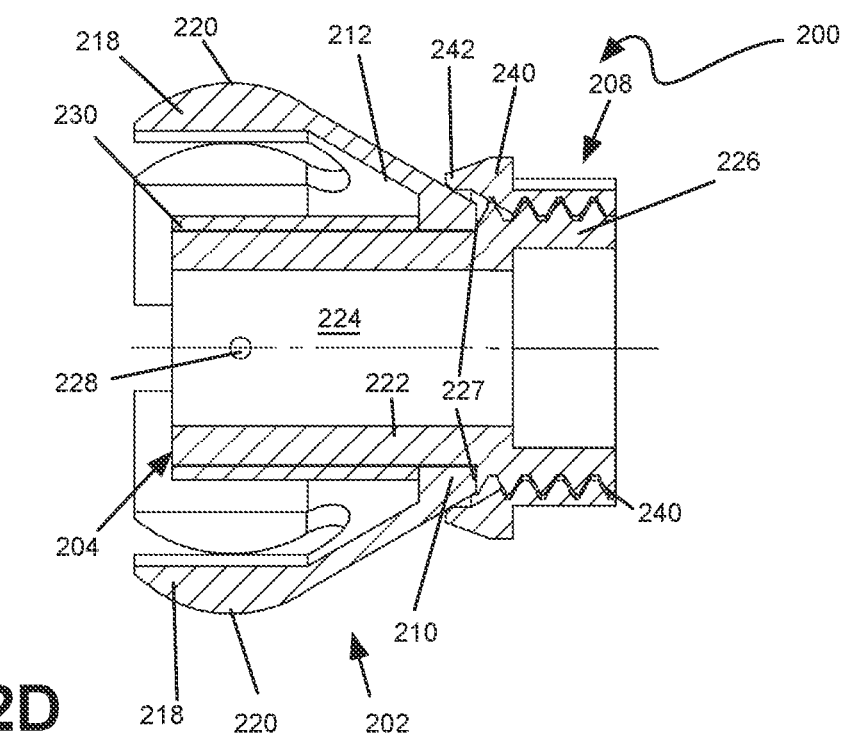
FIG. 2D is a cross-sectional view of the centering assembly of FIG. 2A in the assembled configuration.

FIG. 2A is an exploded perspective view of a centering assembly consistent with a second embodiment described herein. FIG. 2B is an exploded side plan view of the centering assembly of FIG. 2A. FIG. 2C is a perspective view of the centering assembly of FIG. 2A in an assembled configuration. FIG. 2D is a cross-sectional view of the centering assembly of FIG. 2A in the assembled configuration.

Referring to FIGS. 2A-2D, a centering assembly 200 for an eddy current probe incudes a resilient foot element 202, an adjustment shaft 204, a locking collar 206, and an adjustment nut 208. Similar to resilient foot element 102 described above, resilient foot element 202 generally includes a tubular or frustoconical base 210 from which a plurality of resilient cantilevered legs 212 project radially and distally outwardly therefrom. As shown in FIG. 2A, base 210 includes a central aperture 214 extending therethrough and a planar forward end surface 216. Central aperture 214 is sized to accommodate adjustment shaft 204, as described below.

As shown in FIGS. 2A and 2B, each cantilevered leg 212 includes a centering foot 218 at its distal end that includes a curvilinear outer surface 220, at least a portion of which is configured to extend beyond a body of an eddy current probe to which centering assembly 200 is attached (not shown). Centering feet 218 on respective legs 212 extend outwardly, such that the circumferentially spaced centering feet 218, and not the eddy current probe body, slidably engage a conduit or tube in which the probe travels. The resilient nature of cantilevered legs 212 allows each leg to flex as necessary to maintain the probe centered within the conduit when the legs 212 engage the conduit inner surface. In one implementation, resilient foot element 202 includes seven cantilevered legs 212, although any suitable number of legs 212 may be used.

As shown in FIGS. 2A and 2B, adjustment shaft 204 includes a generally tubular body 222 having a central aperture 224 extending therethrough. Central aperture 224 may be sized to receive a portion of a shaft on which an eddy current probe is mounted (not shown). As shown in FIG. 2C, an outside diameter of tubular body 222 is sized for receipt within central aperture 214 of base 210 of resilient foot element 202. A forward end of tubular body 222 includes a threaded portion 226 configured to extend beyond forward end planar forward end surface 216 of resilient foot element 202 to engage adjustment nut 208, as described below. In particular, as shown in FIG. 2D, threaded portion 226 includes a rear engagement surface 227 for engaging planar forward end surface 216 of resilient foot element 202. As shown in FIGS. 2A-2D, a portion of tubular body 222 may include one or more transverse through holes 228 to facilitate assembly of centering assembly 200 and coupling of centering assembly to the eddy current probe.

As shown in FIGS. 2A and 2B, locking collar 206 includes a generally tubular body 230 having a central aperture 232 extending therethrough. Central aperture 232 may be sized to receive a portion of body 222 of adjustment shaft 204. As shown in FIG. 2C, an outside diameter of tubular body 222 is sized for receipt between cantilevered legs 212 of resilient foot element 202. Similar to adjustment shaft 204, a portion of tubular body 230 may include one or more transverse through holes 234 configured to align with through holes 228 to facilitate coupling of foot expander 206 to expander shaft 204.

Consistent with one implementation described herein and as shown in FIG. 2D, locking collar 206 is configured to lockingly position adjustment shaft 204 relative to resilient foot element 202. In particular, during assembly, body 222 of adjustment shaft 204 is inserted through aperture 214 in resilient foot element 202 until rear engagement surface 227 of threaded portion 226 engages forward end surface 216 of resilient foot element 202. Locking collar 206 is then slid onto body 222 of adjustment shaft 204 and coupled thereto via through holes 234/228.

Adjustment nut 208 includes a tubular body 236 having an outer engagement surface 238 and an internal threaded surface 240 configured to engage threaded portion 226 of adjustment shaft 204. In some implementations, outer engagement surface 238 may include a surface configuration for assisting in the turning of adjustment nut 208, such as planar tool engagement portions, a friction surface (e.g., knurling), etc.

Consistent with implementations described herein, a leg deflecting portion 242 projects rearwardly from tubular body 236 of adjustment nut 208 and is configured to engage outer surfaces of cantilevered legs 212, as shown in FIG. 2D. In one implementation leg deflecting portion 242 includes an engagement surface 244 angled inwardly relative to body 236. During assembly, internal threads 240 in adjustment nut 208 are threaded onto threaded portion 226, and adjustment nut 208 is turned such that leg deflecting portion 242 engages the outer surfaces of cantilevered legs 212, thus deflecting cantilevered legs 212 inwardly. In contrast to the embodiment of FIGS. 1A-1D, adjustment 208 may be initially turned such that leg deflecting portion 242 more fully deflects cantilevered legs 212

Periodically, as curvilinear surfaces 220 of centering feet 218 become worn from use, the outside diameter of resilient foot element 202 may be reduced, which may result in centering feet 218 no longer engaging an inside diameter of a conduit under test. Consistent with implementations described herein, to remediate this condition, adjustment nut 208 may be loosened, which causes leg deflecting portion 242 to retract relative to resilient foot element 202. This retraction allows cantilevered legs 212 to expand outwardly, thus restoring the outside diameter of resilient foot element 202 to its initial state. This process may be repeated a number of times, until adjustment nut is fully loosened and resilient foot element 202 is in its most expanded state.

The foregoing description of exemplary implementations provides illustration and description but is not intended to be exhaustive or to limit the embodiments described herein to the precise form disclosed. Modifications and variations are possible in light of the above teachings or may be acquired from practice of the embodiments.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

What is claimed is:

1. A centering assembly for an eddy current probe, comprising:
 a foot element having a plurality of resilient cantilevered legs projecting radially about a central aperture; and
 an adjustment element moveable relative to the foot element for exerting a radial force on the plurality of resilient cantilevered legs,
 wherein the adjustment element comprises:
  a foot expander positioned within the central aperture of the foot element, and
  an adjustment nut, movement of which causes the foot expander to exert the radial force on the plurality of resilient cantilevered legs,
 wherein movement of the adjustment element allows an outside diameter of the plurality of resilient cantilevered legs to be maintained consistent as the plurality of resilient cantilevered legs are worn down during use.

2. The centering assembly of claim 1, wherein the foot element comprises a tubular or frustoconical base and wherein the plurality of resilient cantilevered legs project radially and distally outwardly from the tubular or frustoconical base.

3. The centering assembly of claim 2, wherein the plurality of resilient cantilevered legs are circumferentially spaced from each other.

4. The centering assembly of claim 2, wherein the plurality of resilient cantilevered legs comprise seven circumferentially spaced resilient cantilevered legs.

5. The centering assembly of claim 1, wherein each of the plurality of cantilevered legs comprises a centering foot that includes a curvilinear outer surface configured to engage an interior surface of a conduit under test.

6. The centering assembly of claim 1, wherein the foot expander comprises:
 a tubular body configured to be received within the foot element and aligned with the central aperture of the foot element; and
 a flange portion projecting radially outwardly from a forward portion of the tubular body,
 wherein the flange portion is configured to engage portions of the plurality of resilient cantilevered legs.

7. The centering assembly of claim 6, further comprising:

an expander shaft, comprising:
  a tubular body configured to be received within and secured to the tubular body of the foot expander; and
  a threaded portion provided at a forward end of the expander shaft,
  wherein the threaded portion extends through the central aperture of the foot element and threadingly engages the adjustment nut to retain the foot element between the flange portion and the adjustment nut.

8. The centering assembly of claim 7, wherein an inside surface of the plurality of resilient cantilevered legs comprise an outwardly angled configuration, such that forward movement of the flange portion of the foot expander against the inside surface of the plurality of resilient cantilevered legs causes the centering feet to move radially outwardly and rearward movement of the flange portion of the foot expander against the inside surface of the plurality of resilient cantilevered legs allows the centering feet to move radially inwardly.

9. The centering assembly of claim 7, wherein the tubular body of the expander shaft includes an inside diameter configured to receive a portion of the eddy current probe therein.

10. The centering assembly of claim 1, wherein the adjustment nut comprises an outer engagement surface.

11. A centering assembly for an eddy current probe, comprising:
  a foot element having a plurality of resilient cantilevered legs projecting radially about a central aperture; and
  an adjustment element moveable relative to the foot element for exerting a radial force on the plurality of resilient cantilevered legs,
  wherein the adjustment element comprises:
    an adjustment nut having a leg deflecting portion projecting rearwardly therefrom,
    wherein movement of the adjustment nut causes the leg deflecting portion to exert the radial force on the plurality of resilient cantilevered legs,
  wherein movement of the adjustment element allows an outside diameter of the plurality of resilient cantilevered legs to be maintained consistent as the plurality of resilient cantilevered legs are worn down during use.

12. The centering assembly of claim 11, wherein the adjustment element further comprises:
  an adjustment shaft having a tubular body configured to be received within the central aperture of the foot element,
  wherein the adjustment shaft includes a threaded forward end having an outside diameter greater than an inside diameter of the central aperture of the foot element,
  wherein the threaded forward end is configured to engage corresponding threads on the adjustment nut.

13. The centering assembly of claim 12, wherein the threaded forward end of the adjustment shaft comprises external threads and wherein the threads on the adjustment nut comprise internal threads.

14. The centering assembly of claim 13, wherein the adjustment nut further comprises an outer engagement surface.

15. The centering assembly of claim 12, wherein the adjustment element further comprises:
  a tubular locking collar configured to receive and couple to the tubular body of the adjustment shaft within the foot element,
  wherein an outside diameter of the tubular locking collar is greater than the inside diameter of the central aperture of the foot element, and wherein a length of the tubular locking collar is configured such that the tubular a forward end of the tubular locking collar engages an inside surface of the foot element adjacent the central aperture to secure foot element to the adjustment shaft.

16. The centering assembly of claim 12, wherein the tubular body of the adjustment shaft includes an inside diameter configured to receive a portion of the eddy current probe therein.

17. A non-destructive conduit testing assembly, comprising:
  an eddy current probe; and
  two or more centering assemblies coupled to the eddy current probe and configured to maintain the eddy current probe in a position centered within a conduit under test,
  wherein each of the two or more centering assemblies comprises:
    a foot element having a plurality of resilient cantilevered legs projecting radially and rearwardly about a central aperture;
    a foot expander positioned within the central aperture of the foot element for exerting a radial force on the plurality of resilient cantilevered legs; and
    an adjustment nut threadingly coupled to the foot expander,
    wherein movement of the adjustment nut causes the foot expander to exert the radial force on the plurality of resilient cantilevered legs.

18. The non-destructive conduit testing assembly of claim 17, wherein the foot expander comprises:
  a tubular body configured to be received within the foot element and aligned with the central aperture of the foot element; and
  a flange portion projecting radially outwardly from a forward portion of the tubular body,
  wherein the flange portion is configured to engage portions of the plurality of resilient cantilevered legs.

19. A non-destructive conduit testing assembly, comprising:
  an eddy current probe; and
  two or more centering assemblies coupled to the eddy current probe and configured to maintain the eddy current probe in a position centered within a conduit under test,
  wherein each of the two or more centering assemblies comprises:
    a foot element having a plurality of resilient cantilevered legs projecting radially and rearwardly about a central aperture;
    an adjustment shaft having a tubular body configured to be received within the central aperture of the foot element; and
    an adjustment nut threadingly coupled to the adjustment shaft,
    wherein the adjustment shaft includes a threaded forward end having an outside diameter greater than an inside diameter of the central aperture of the foot element,
    wherein the threaded forward end is configured to engage corresponding threads on the adjustment nut,
  wherein the adjustment nut includes a leg deflecting portion projecting rearwardly therefrom,
  wherein movement of the adjustment nut causes the leg deflecting portion to exert a radial force on the plurality of cantilevered legs.

* * * * *